(12) United States Patent
Dadheech et al.

(10) Patent No.: US 10,104,442 B2
(45) Date of Patent: *Oct. 16, 2018

(54) SOCIAL DELIVERY OF IPTV STREAMS

(71) Applicant: International Business Machines Corporation, Armonk, NY (US)

(72) Inventors: Himanshu Dadheech, Waterford (IE); Jonathan Dunne, Dungarvan (IE); Paul B. French, Cork (IE); James P. Galvin, Jr., Georgetown, KY (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,544

(22) Filed: Feb. 20, 2018

(65) Prior Publication Data
US 2018/0176657 A1  Jun. 21, 2018

Related U.S. Application Data

(63) Continuation of application No. 14/615,618, filed on Feb. 6, 2015, now Pat. No. 9,986,300, which is a (Continued)

(51) Int. Cl.
*H04N 7/173* (2011.01)
*H04N 21/6338* (2011.01)
(Continued)

(52) U.S. Cl.
CPC ... *H04N 21/6338* (2013.01); *H04N 21/25866* (2013.01); *H04N 21/2668* (2013.01); (Continued)

(58) Field of Classification Search
CPC ........... H04N 21/2668; H04N 21/6175; H04N 21/64322; H04N 21/64761
See application file for complete search history.

(56) References Cited

U.S. PATENT DOCUMENTS 8,490,125 B2   7/2013  Grubb
2005/0289618 A1  12/2005  Hardin
(Continued)

FOREIGN PATENT DOCUMENTS

WO   WO2009048299   4/2009

OTHER PUBLICATIONS

List of IBM Patents or Patent Applications Treated as Related, dated Feb. 20, 2018, 2 pages.

*Primary Examiner* — Kunal Langhnoja
(74) *Attorney, Agent, or Firm* — Scully, Scott, Murphy & Presser, P.C.; L. Jeffrey Kelly

(57) ABSTRACT

Delivery of internet protocol television (IPTV) content, in one aspect, may comprise monitoring social media streams. Trends may be identified from the social media streams, the trends describing interests in IPTV content by location, time and subscriber types. Information may be received associated with a schedule for delivering the IPTV content. The trends may be compared with the received information to predict an expected demand of the IPTV content at the time at different locations and by different subscriber types. Resources may be reallocated to meet the expected demand in delivering the IPTV content to the different subscriber types at the different locations and the time.

16 Claims, 9 Drawing Sheets

Related U.S. Application Data continuation of application No. 14/330,573, filed on Jul. 14, 2014.

(51) Int. Cl.
*H04N 21/61* (2011.01)
*H04N 21/2668* (2011.01)
*H04N 21/647* (2011.01)
*H04N 21/258* (2011.01)
*H04N 21/643* (2011.01)
*H04N 21/25* (2011.01)
*H04N 21/24* (2011.01)

(52) U.S. Cl.
CPC ... *H04N 21/6175* (2013.01); *H04N 21/64322* (2013.01); *H04N 21/64738* (2013.01); *H04N 21/64761* (2013.01); *H04N 21/24* (2013.01); *H04N 21/251* (2013.01)

(56) References Cited

U.S. PATENT DOCUMENTS

| | | |
|---|---|---|
| 2009/0183218 A1 | 7/2009 | Li et al. |
| 2011/0126247 A1* | 5/2011 | Howarter .......... H04N 7/17318 725/95 |
| 2012/0174169 A1 | 7/2012 | Nandiraju |
| 2012/0216038 A1 | 8/2012 | Chen et al. |
| 2013/0311408 A1* | 11/2013 | Bagga .................. G06N 99/005 706/12 |
| 2015/0012593 A1* | 1/2015 | Phillips ............... H04L 67/2847 709/204 |

* cited by examiner

SOCIAL DELIVERY OF IPTV STREAMS

FIELD

The present application relates generally to computers, and computer applications, and more particularly to load balancing in data streaming such as IPTV streaming.

BACKGROUND

Internet Protocol television (IPTV) is a system that delivers television content using Internet Protocol. IPTV systems provide users with greater flexibility and choice of content including Video-on-Demand (VoD), live TV, video recording capabilities, time-shifted television (TSTV), Subscription VoD services, High Definition (HD) subscription, etc., as compared to legacy cable networks.

This service requires precisely orchestrated technologies to deliver quality viewing experience. At the same time the subsystem is required to maintain an optimized allocation of network resources to deliver promised quality of service for all users and to balance the load of video streams to prevent infrastructure faults or system failures.

One drawback of live and on demand service capabilities is dynamic load shifting depending on the demands based on location, time and subscriber type. This non-deterministic behavior of user demands may result in network congestion, poor quality of service, discontinuous telecast, link failure and even subsystem failure which hampers the service quality and degrades the user experience.

BRIEF SUMMARY

A method for delivery of internet protocol television (IPTV) content, in one aspect, may comprise monitoring social media streams. The method may also comprise identifying trends from the social media streams, the trends describing interests in IPTV content by location, time and subscriber types. The method may further comprise receiving information associated with a schedule for delivering the IPTV content. The method may also comprise comparing the trends with the received information to predict an expected demand of the IPTV content at the time at different locations and by different subscriber types. The method may further comprise reallocating resources to meet the expected demand in delivering the IPTV content to the different subscriber types at the different locations and the time.

A system for delivery of internet protocol television (IPTV) content, in one aspect, may comprise a hardware processor and a storage device. The hardware processor may be operable to monitor social media streams. The hardware processor may be further operable to identify trends from the social media streams, the trends describing interests in IPTV content by location, time and subscriber types. The hardware processor may be further operable to store the trends in the storage device. The hardware processor may be further operable to receive information associated with a schedule for delivering the IPTV content. The hardware processor may be further operable to compare the trends with the received information to predict an expected demand of the IPTV content at the time at different locations and by different subscriber types. The hardware processor may be further operable to reallocate resources to meet the expected demand in delivering the IPTV content to the different subscriber types at the different locations and the time.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
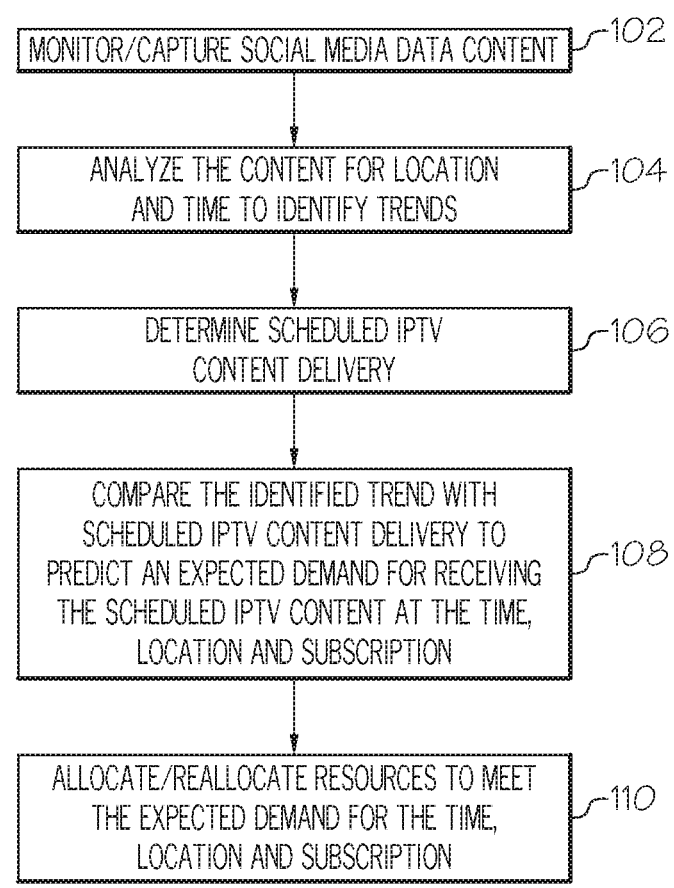
FIG. 1 is a flow diagram illustrating an overview of a method in one embodiment of the present disclosure.

A methodology in one embodiment provides for network load balancing and optimized allocation of network resources in three-dimensional space—location, time and subscription type—for example, in IPTV stream delivery. For instance, a large number of users demanding the same stream or schedule to view a live stream at the same time may create unbalanced load on the network. A large number of users in the same locality tuning to the same stream such as a soccer match may create congestion on the link serving that locality. Different class of subscribers demanding the same video stream could hamper the quality of service (QOS) for high definition subscribers as the stream load may be more than the stream delivery system can handle.

The methodology of the present disclosure in one embodiment may leverage contents available on online social media for optimizing the network resource allocation and balancing the load on particular network stream. Currently known systems and methods do not account for such time-location-subscription based optimization and quality assurance service at such time of resource crisis. They do not leverage the information already present online to predict the future trends and act accordingly for optimizing the system and maximizing the QOS to avoid problems.

If there is knowledge that there may be a QoS problem based on current user viewing trends then corrective measures may be taken based on this information. For example, at the time of a soccer match, the IPTV service provider may allocate more resources to a specific location where the likelihood of viewing the match is more to ensure better performance for all and QOS assurance for class subscribers. This location time based resource allocation may help in user satisfaction and may also save the congestion and failure of the infrastructure in the worst case.

Likewise, these trends may also help to direct the IPTV system administrators for scalability, renovation and redundancy in infrastructure to ensure a high quality service and maximizing QOS based on time, duration, social status, subscription class, location, demographic dividend and popular trends.

The methodology of the present disclosure in one aspect may address the need of real time specific content monitoring, with ability to filter out time and location based trends for performing demand based renovation in the infrastructure and resource allocation in self-optimizing IPTV system using the social contents available online. In one embodiment, such knowledge (e.g., time, location, subscription type trends for demand) is made to surface in real time and is kept up to date in real time to allow service provider identify the patterns of issues related to location and time based congestion in resources and to perform predictive remedial actions proactively.

The methodology disclosed herein may be implemented in forms of a computer-implemented method, a system, and a computer device that stores and executes computer or machine executable instructions for performing the methodology.

In one aspect, the methodology may include a social content monitoring system and method that predicts the content being watched on IPTV subsystem from social and content trends online, for example, on social networking, micro-blogging, search engine and media sites, with the notion that the more interest there is in a given content, then the more likelihood that the masses will tune in. From such trends the delivery system may calibrate and refactor delivery subsystems around predictions, for example, optimizing the system for maximized QOS and advanced prediction with a view to avoiding problems. The log of such events occurring in real time may be kept up to date to allow service provider identify the patterns of issues related to location and time based congestion in resources for implementing adequate scalability, renovation and redundancy infrastructure, for example, to ensure high quality service and maximized QOS for all subscribers in the future.

Currently, IPTV systems use the internet as backbone for transmission of its contents to the users whose quality relies on the resources allocated to the user and the channel condition. In general the quality of a link is assessed on the basis of a few channel parameters like bandwidth, delay, jitter and packet loss ratio. One or more of these parameters are interdependent and worsening of even one could lead to a low QOS. For IPTV system, QOS is a major parameter for performance evaluation and is used as a quality assurance for its subscribers.

In one embodiment of the present disclosure, e.g., to assure improved QOS for subscribers at all times in all locations, not only the physical resources but the information available online may be leveraged to guide the allocation of those physical resources. In the present disclosure in one embodiment, the internet with its vast pool of information and real time data, serves as a central node for decision making via content of interest monitoring and filtering popular trends from social networking, micro-blogging, other social media, and search engines.

The following describes an example use case. Consider that there is a soccer match between home team and old time rival visitors which appeals to not only local masses but also tourists. People start searching for places near-by soccer clubs, pubs, social clubs and open live arena to enjoy the match. They start updating their interest in the match and the location of interest to watch the match, for example on social media such as on social networking and micro blogging sites. Simultaneously, high definition subscribers plan to watch the match independently at home to enjoy the broad spectrum, high quality video service that they have subscribed to. IPTV service provider filters the trends of interest appearing online, based on location and time and identifies the pattern of bandwidth usage in a particular area at a time. This knowledge enables the service to reallocate the bandwidth distribution and redirect extra bandwidth to areas with high probability of demand and viewing to avoid congestion on the link. This not only may prevent the violation of service level agreement with its high definition subscribers but also may provide better user satisfaction and avoid the possibility of link or subsystem failure. This allows the service provider to plan the future trends too, e.g., for providing quality infrastructure for upcoming popular events that will be streamed, for example, through predictions using the current trends of similar events.

In one aspect, using online content monitoring for load balancing in IPTV networks may provide the following advantages, but not limited to only those: Time-location-subscriber based three dimensional space model of decision making for allocation of resources to users based on demand and prediction by online content-of-interest monitoring largely serves to predict and thereby avoid the problem of network congestion and QOS assurance; Redirection of resources based on online data may, not only save redundancy of resources but also may assure user satisfaction and service level business agreements; Additionally it may provide a wide range of ideas to the service provider for installation and upgrade of top class infrastructure with priority for content based demands in future; It may guide system administrators to think upon additional redundancy to avoid failure of infrastructure at the time of network and resource crisis—this may be done by analyzing the patterns in the usage of specific contents such as sports versus movies versus fashion channels in specific areas. The methodology of the present disclosure in one embodiment may guide the service provider to identify the patterns of load balancing and resource usage based on online contents to predict the future usage and renovate the infrastructure accordingly. One or more proactive actions may be taken based on the prediction of the likelihood of a QoS problem.

FIG. 1 is a flow diagram illustrating an overview of a method in one embodiment of the present disclosure. Generally, trends identified from social streams with IPTV content may be compared to identify demand based on location and time. Resources may be allocated based on the demand. The method may provide for an enhanced quality of service load balancing in IPTV networks whereby social content is analyzed to identify viewing trends. Those trends may be compared with IPTV content to identify demand both on time and location. This comparison may be used to provide sufficient allocation of resources to meet that demand. Referring to FIG. 1, at 102, social media data or stream may be monitored or captured for content. For example, such data may be made available via a web server that provides social media capabilities. The social media data or stream that is monitored and captured may be from social networking sites, micro-blogging sites, news streams, search engines and other media sites. In one embodiment, the processing at 102 may include (a) collecting the social media data in real time and (b) analyzing the data in order to ascertain the insights, e.g., predicting future demand for IPTV services. Known methods and products may be utilized for collecting social media data.

At 104, the content (social media stream) is analyzed for location and time to identify trends, for example, to determine from the content and predict at which location and what time frame certain IPTV content may be in demand. Thus, for example, the identified trends may describe or tell interests in IPTV content by location, time and subscriber types. At 106, scheduled IPTV content may be determined or received. For example, an IPTV content delivery service provider may have a scheduled list of IPTV content for delivery; e.g., this schedule would be part of the service providers (SP) advertised program guide. IPTV in one aspect may support Video-on-Demand (VoD), live TV, video recording capabilities, time-shifted television (TSTV), subscription VoD services, High Definition subscription, and/or others. A subscriber of IPTV service may select subscriptions for high definition (HD), low definition (LD), Internet, Video-On-Demand, and/or others.

At 108, the identified trends are compared to the scheduled IPTV content, for example, to predict an expected demand for the IPTV content at the time at different locations and by different subscriber types. For example, for each (or a sub-set) IPTV program that is advertised as part of the SP's program guide, the demand is measured in terms of location, the number of people at those locations and the breakdown of the type of subscriber at those locations. Based on this comparison, in one aspect, the optimum distribution and allocation of resources can be determined for each program.

At 110, resources may be allocated and/or reallocated to meet the expected demand in delivering the IPTV content to the different subscriber types at the different locations and the time. The resources to meet the expected demand may consider factors such as scalability, renovation, redundancy infrastructure to ensure high quality of service, and factors for maximizing QOS for the current and/or future subscribers. For example, reallocating resources may include redistributing network and computer resources, e.g., bandwidth capability in networks that deliver the IPTV content to the different locations. Redistributing bandwidth is an example resource that can be reallocated. Other resources that could be reallocated or added may include memory, CPU, additional network nodes, and others. A methodology of the present disclosure in one embodiment may provide for optimum delivery of IPTV content.

Figure 2:
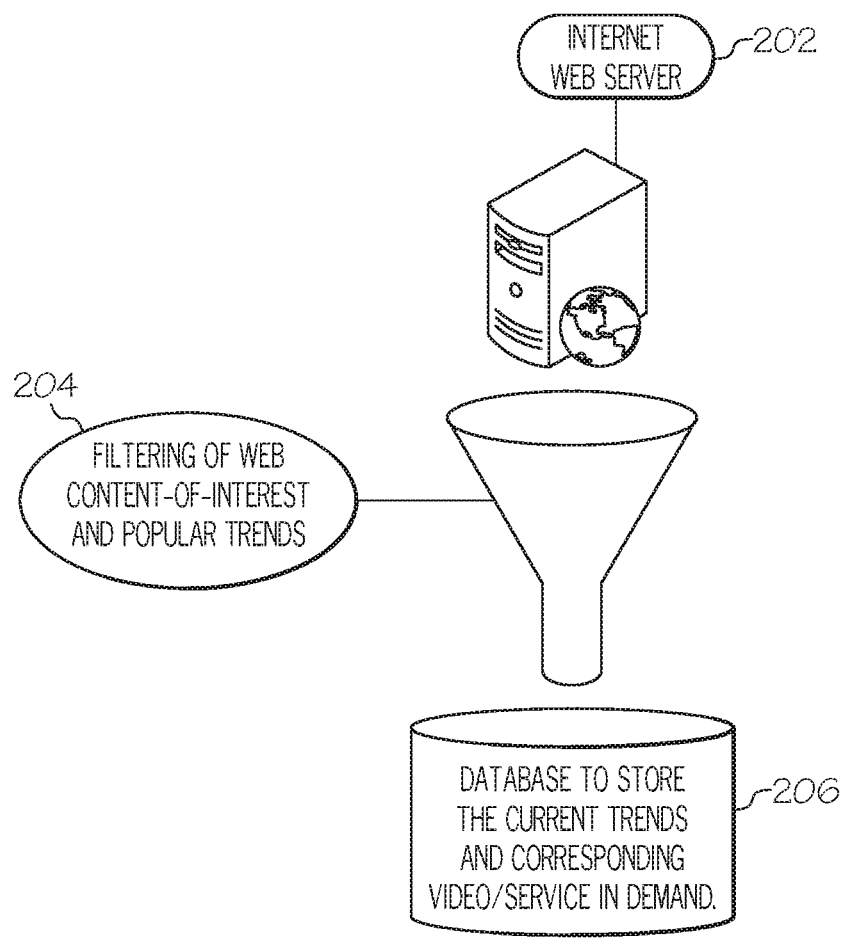
FIG. 2 is a diagram that illustrates capturing and analyzing of social stream in one embodiment of the present disclosure.

FIG. 2 is a diagram that illustrates capturing and analyzing of social stream in one embodiment of the present disclosure. Social media data, e.g., social networking site posts, micro-blogging posts, and other such communication data among users may be retrieved or received from a web server 202 that provides, for example, over the Internet. The web server may be one that provides such social media capabilities and/or which can provide social stream content. For instance, the current popular trends, status and content of general interest from the Internet may be captured via social networking, micro-blogging, search engine's popular search. For instance, data analytics techniques and mechanism can be used to retrieve and monitor this 'moving data'. In one embodiment, data relating to the IPTV program guide is filtered, and various analysis techniques such as pattern analysis, sentiment analysis are used to determine trends and demand. As shown at 204, the social media stream data may be analyzed, for example, filtered for content of interest and popular trends. A database or storage device 206, for example, may store the current trends and corresponding IPTV program video/service in demand.

Figure 3:
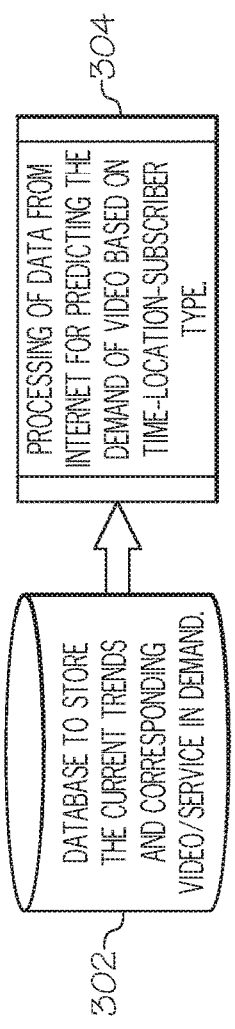
FIG. 3 is a diagram that shows a processing of the data uncovered related to the identified trends in one embodiment of the present disclosure.

FIG. 3 is a diagram that shows a processing of the data uncovered related to the identified trends in one embodiment of the present disclosure. For instance, the captured data 302 may be filtered with preferences to time, location and content to be broadcasted on IPTV network as shown at 304. For example, the IPTV service provider has a publicized schedule of programs (Program Guide) for each day/channel. A sub-set (or all) of this Program Guide may be used as the initial filter (e.g., Sport Channel 1, Time 8 PM, International Rugby match between X and Y teams). This is then used to determine the filter in which to retrieve the social media data. This process provides the idea of the future demand of certain video stream in some specific locations at some specific times by a group of specific users.

Figure 4:
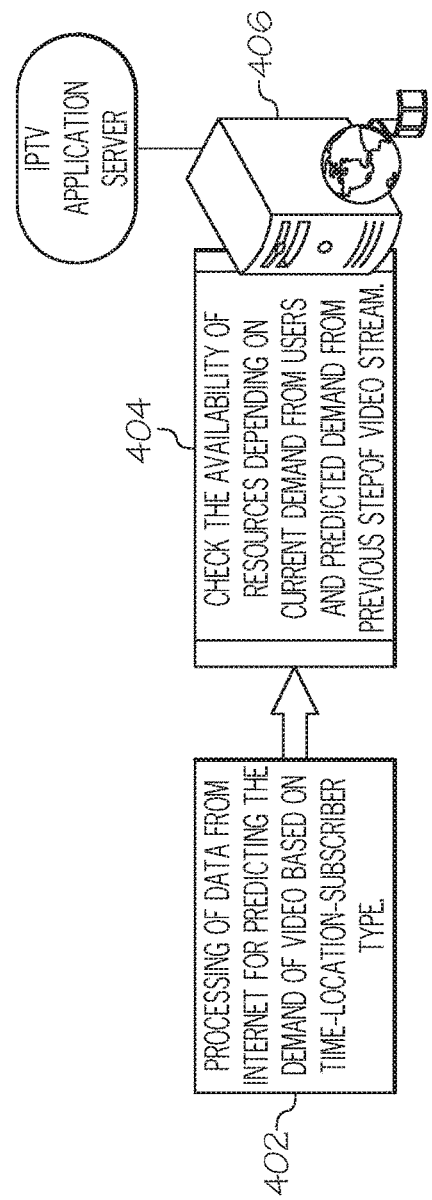
FIG. 4 is a diagram that shows a processing of the predicted demand in one embodiment of the present disclosure.

FIG. 4 is a diagram that shows a processing of the predicted demand in one embodiment of the present disclosure. For example, based on the data from Internet for predicting the demand of video according to time-location-subscriber type 402, the availability of resources depending on current demand from users and predicted demand estimated at 402, may be checked for at 404. For example, a check is made for the current demand and availability of resources for the predicted demand of the video stream to check the feasibility and specifications of network and physical resource required for it. For example, an IPTV application server 406 may have information associated with the resources and the current demand.

Figure 5:
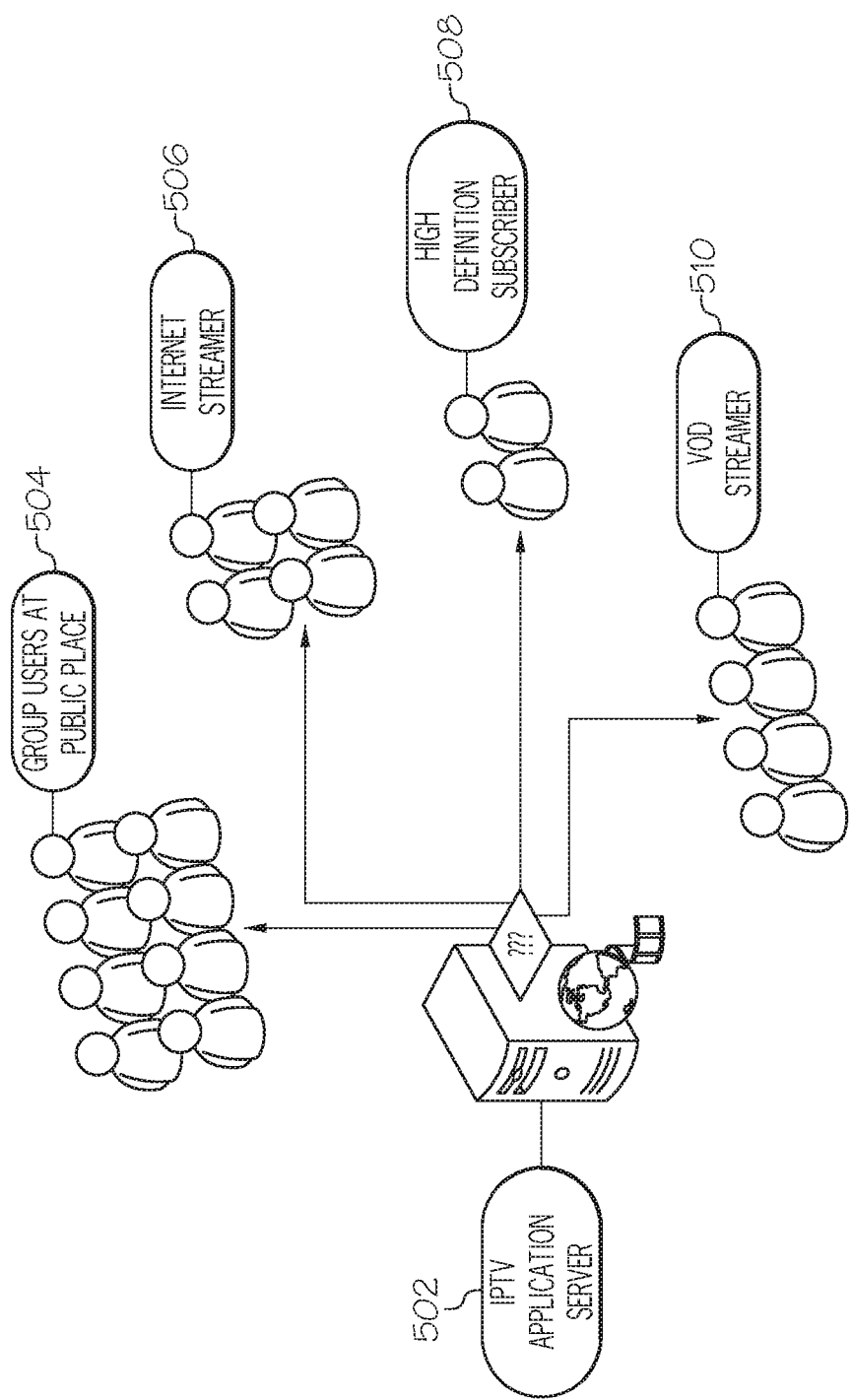
FIG. 5 is a diagram illustrating distribution of resources in one embodiment of the present disclosure.

FIG. 5 is a diagram illustrating distribution of resources in one embodiment of the present disclosure. Based on the predicted demand, for example, plans may be created for the distribution or reallocation of all resources to cater the needs of predicted demand as well as maintain the promised quality of service to all subscribers. For instance, an IPTV application server 502 may allocate resources for a group of users at public place 504, Internet streaming users 506, High Definition subscribers 508, VOD streaming users 510, and/or others. In one aspect, if the resources are available and could be reallocated, then resources may be first provided to high definition subscribers and then next allocated for normal subscribers and internet streamers.

Figure 6:
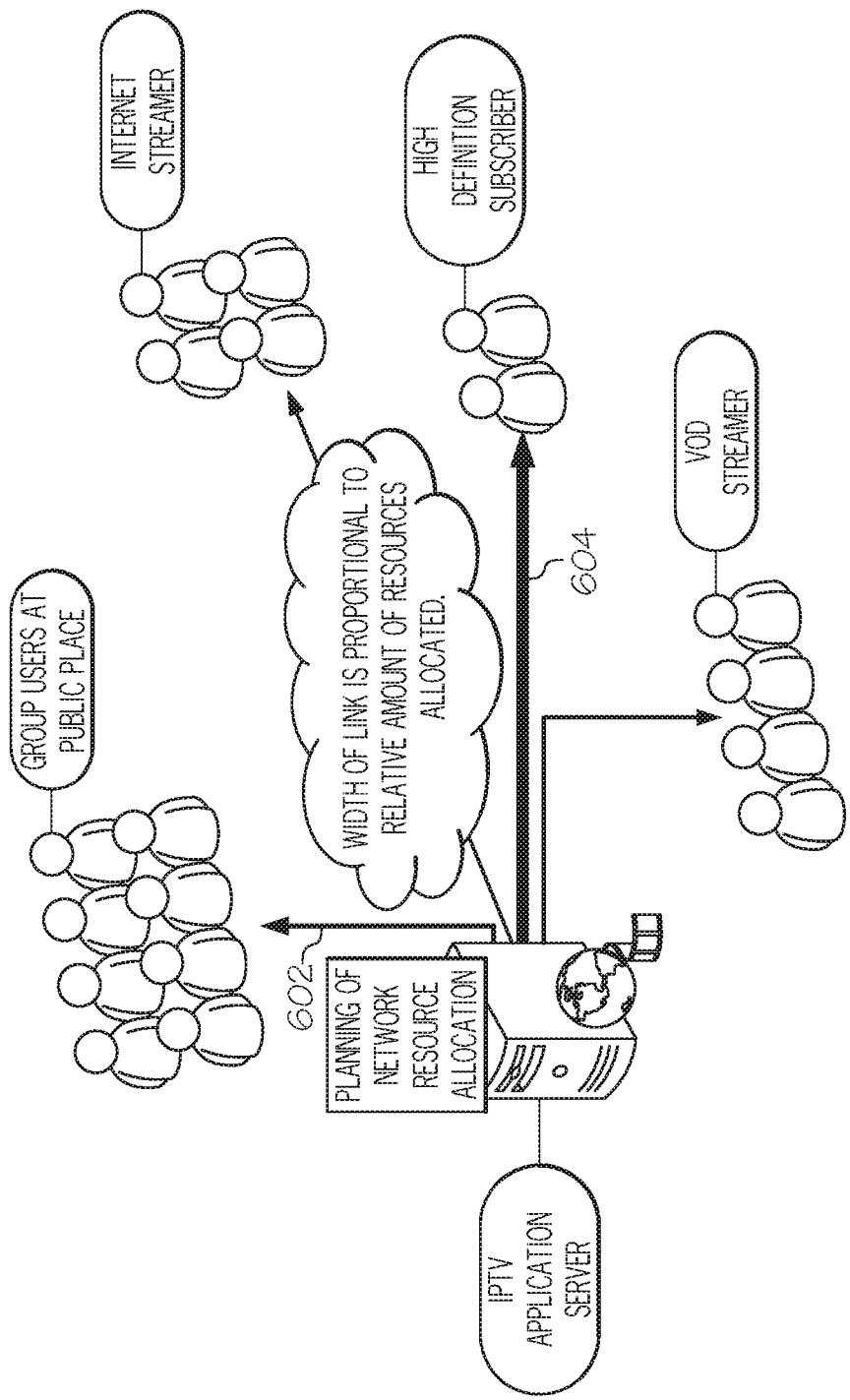
FIG. 6 is a diagram illustrating planning of network resource allocation in one embodiment of the present disclosure.

FIG. 6 is a diagram illustrating planning of network resource allocation in one embodiment of the present disclosure. For instance, as shown at 602 and 604, additional resources may be allocated where there is high or more demand.

Figure 7:
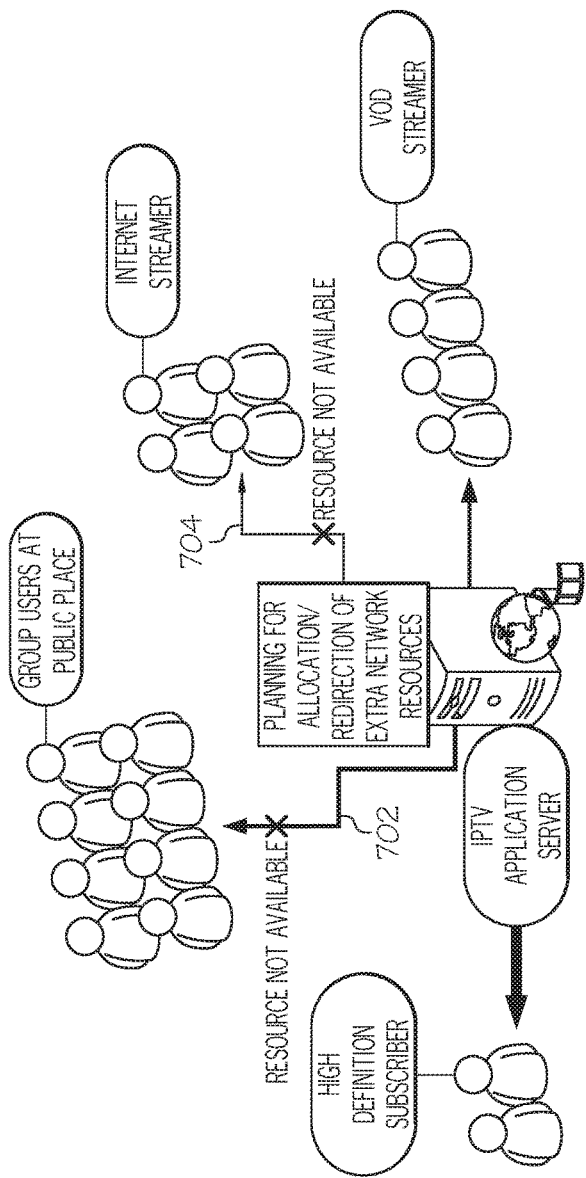
FIG. 7 is another diagram illustrating planning for allocation of resources in one embodiment of the present disclosure.

FIG. 7 is another diagram illustrating planning for allocation of resources in one embodiment of the present disclosure. In one embodiment, if all the resources required for predicted demand are not available, then plans may be made in advance to provide extra resources to all users so as to avoid congestion and any condition of crisis at the moment of broadcasting. For example, as shown at 702 and 704, redirection or extra network resource allocation or redirection may be planned for unavailable resources.

Figure 8:
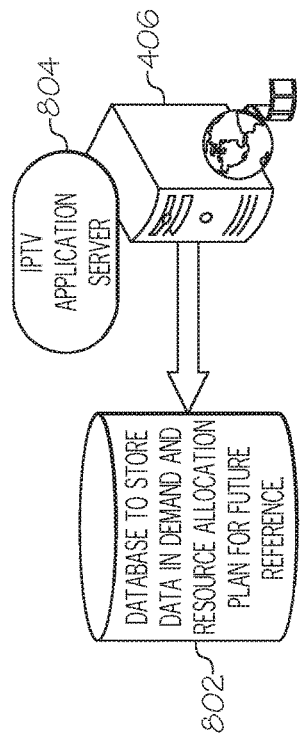
FIG. 8 is a diagram that illustrates storing data in demand and resource allocation plan in one embodiment of the present disclosure.

FIG. 8 is a diagram that illustrates storing data in demand and resource allocation plan in one embodiment of the present disclosure. In one aspect, a backup of the data in demand and resource requirement and planning 802 may be stored for future references, for example, by an IPTV application server 804 or the like. Pattern recognition of on demand video system may be stored, e.g., to avoid any crisis and to train the network for self optimized resource allocation. Thus, the success (or otherwise) of the current algorithm for distribution of resources based on predicted demand may be measured. Over time, these data can be used to 'train' the algorithm in order to improve it.

Figure 9:
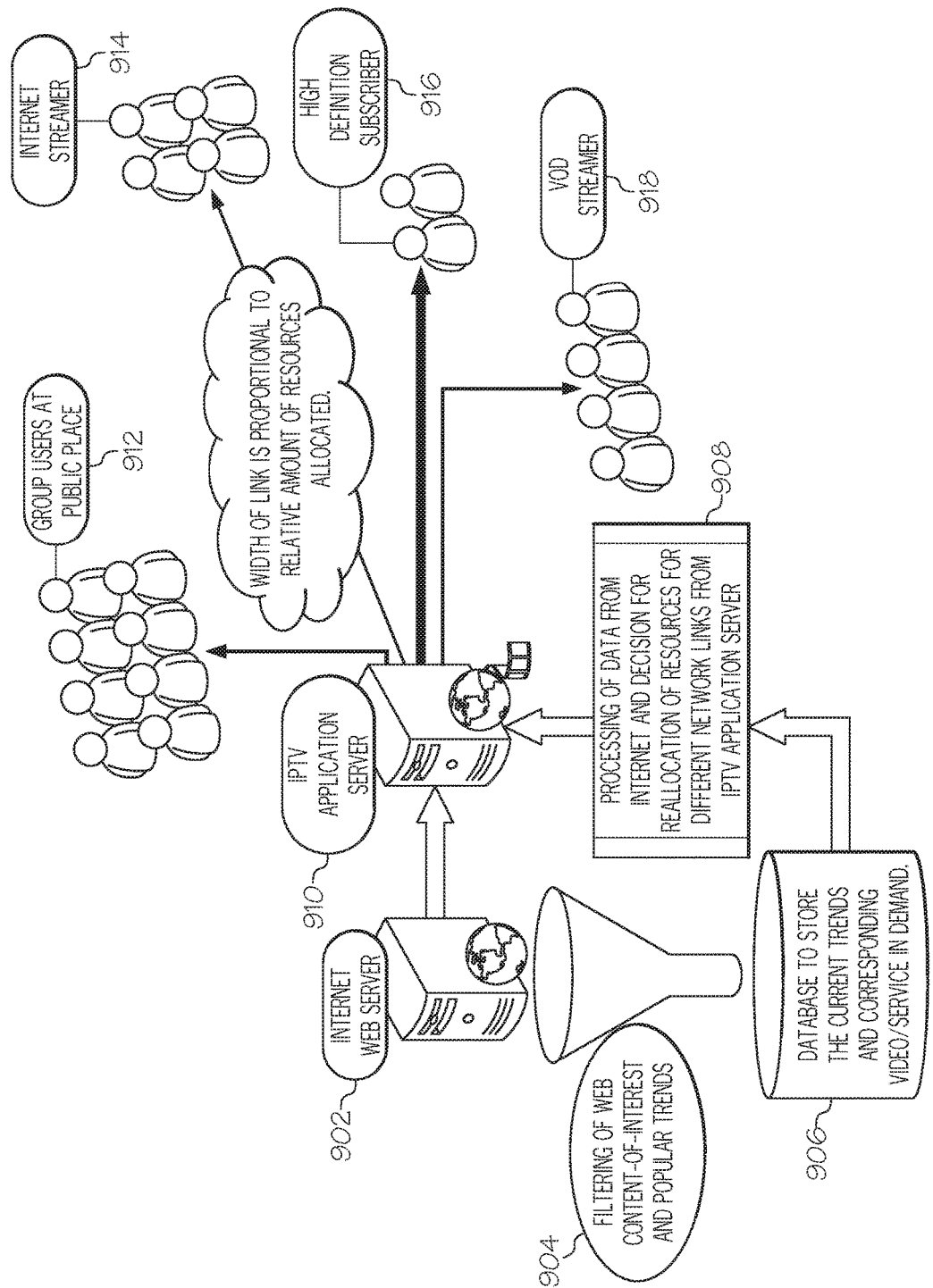
FIG. 9 is a diagram that illustrates an overall process of IPTV delivery of the present disclosure in one embodiment.

FIG. 9 is a diagram that illustrates an overall process of IPTV delivery of the present disclosure in one embodiment. In one aspect, the stream in demand may be broadcasted to all users including high definition subscribers, normal class subscribers, internet streamers, on-demand video subscribers and group subscribers without any congestion and with assured quality of service. FIG. 9 shows a general process of flow of information from Web server to users and reallocation of resources at IPTV application server depending on filtered web trends and content-of-interest. At 902, social media content is received, for example, from a web server that provide social media services or another web server. At 904, the received social media content is analyzed and filtered. The filtering outputs content of interest and/or popular trends among users, e.g., current trends. The trends are stored in a database or a storage device at 906. The trends may identify the time, location and different types of subscribers for video content demand or IPTV content demand. Information associated with such video or IPTV content may be also stored. At 908 the data stored is processed to make plans for decisions for reallocation of resources for different network links from IPTV application server 910. Shown at 910, based on one or more allocation and/or reallocation plans, resources for streaming IPTV content may be allocated. For instance, different network resource capacities may be allocated to different types of users and subscribers 912, 914, 916, 918.

Figure 10:
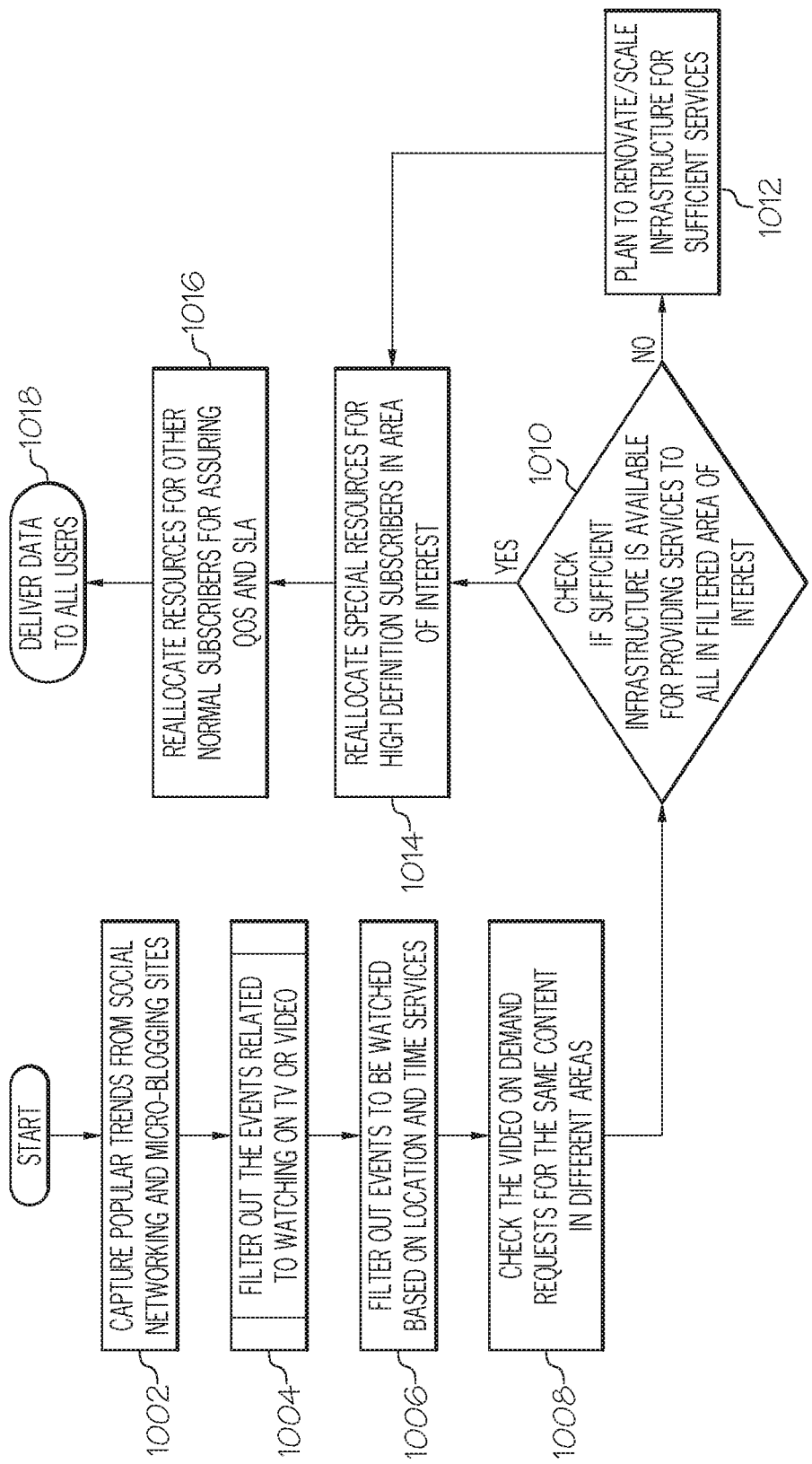
FIG. 10 is a flow diagram illustrating a process of capturing social media information and delivering IPTV data to users based on the captured information in one embodiment of the present disclosure.

FIG. 10 is a flow diagram illustrating a process of capturing social media information and delivering IPTV data to users based on the captured information in one embodiment of the present disclosure. At 1002, popular trends from social media, for example, social networking and micro-blogging sites may be captures. This may be performed, for example, by receiving data comprising use communication or post content from such social media sites or another service, and analyzing the data. At 1004, the received data may be analyzed. Data analysis, for example, may utilize pattern recognition techniques and/or others to recognize popular content or among user communications. Data analytics techniques and mechanism (e.g., including those for structured and unstructured data) can be used to retrieve and monitor this 'moving data'. For instance, initially data relating to the IPTV program guide may be filtered, then e.g., subsequently various analysis techniques such as pattern analysis, sentiment analysis may be used to determine trends and demand. The data analysis may filter out events related to watching on TV or video.

At 1006, the filtered events related to watching TV or video may be filtered or categorized based on location, time and subscription type.

At 1008, requests for the video on demand for the same content in the same or different areas are checked. This information, e.g., would be known to the IPTV service provider in advance. Examples include pre-paid subscriptions or pay-per-view bookings.

At 1010, it is checked whether there is sufficient infrastructure available for providing services to all in filtered area of interest. The formation filtered at 1006 identifies or predicts amount of demand for certain content at identified location and time, and for example, by a subscriber type. The information acquired at 1008 also identifies the amount of demand for the same content at different locations. The available resources or allocated resources for providing the content to those locations at the specified time to the different subscribers are identified, and it is determined whether those available resources are sufficient to provide the service of delivering the content to all the identified locations and user. For example, from this analysis, the number of people, the type of subscriber and the location for a particular program is known. Based on this information, it can be determined what resources in terms of network bandwidth, processing power, jitter, delay, loss will be required to meet that demand. Also based on the IPTV service provider's in-house monitoring systems, the current performance that is being delivered and the extra capacity available can be determined. Therefore, based on the current performance and current available capacity, and the predicted future performance required, the extra resources required to meet the predicted demand may be determined.

At 1012, if it is determined that the available resources are not sufficient, additional planning may be performed to renovate and/or scale infrastructure for sufficient services. The processing proceeds to 1014.

If it is determined that the available resources are sufficient at 1010, the processing also proceed to 1014. At 1014, resources may be allocated or reallocated for high definition subscribers. For example, additional bandwidth or sufficient bandwidth may be allocated for providing the content to the high definition subscribers.

At 1016, resources may be allocated or reallocated for other subscribers, for example, to assure QOS and service level agreement (SLA).

At 1018, using the allocated or reallocated resources, the content is delivered to all users.

Figure 11:
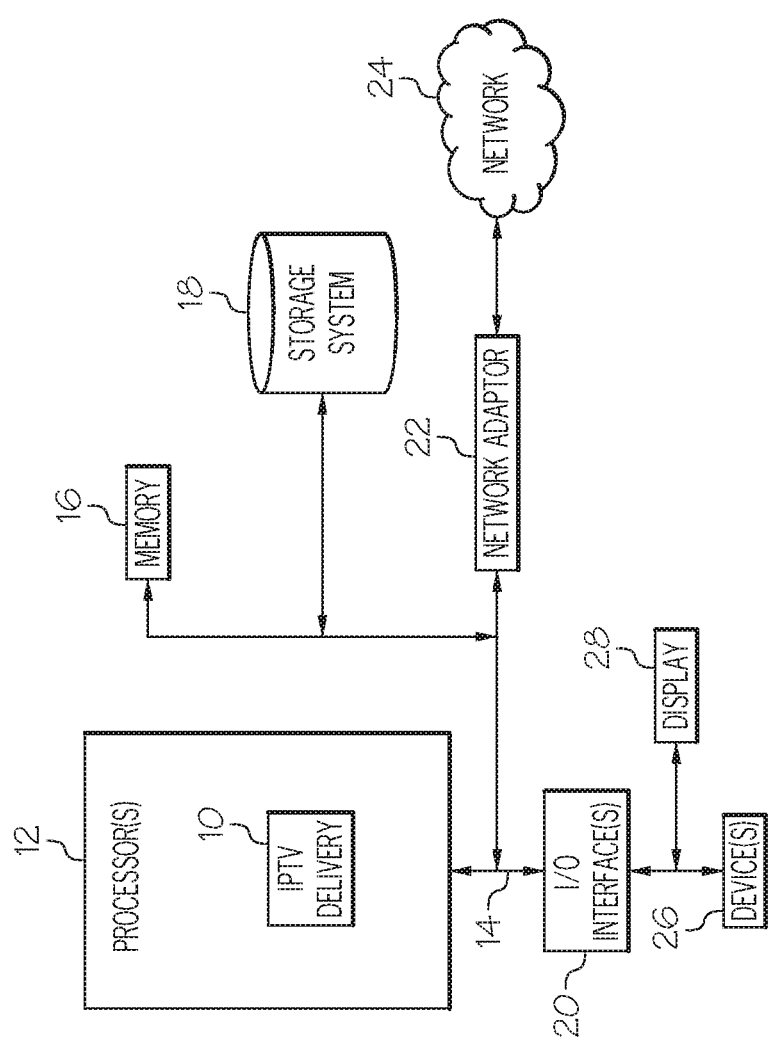
FIG. 11 illustrates a schematic of an example computer or processing system that may implement an IPTV delivery system in one embodiment of the present disclosure.

FIG. 11 illustrates a schematic of an example computer or processing system that may implement an IPTV delivery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A non-transitory computer readable storage medium storing a program of instructions executable by a machine to perform a method of delivery of Internet protocol television (IPTV) content, the method comprising:

monitoring, by at least one processor, social media streams;

receiving, by the at least one processor, information associated with a schedule for delivering the IPTV content, the schedule comprising a real-time event occurring at a particular time for real-time viewing of the real-time event, wherein the IPTV content comprises the real-time event occurring at the particular time that has been scheduled;

identifying trends from the social media streams comprising filtering the social media streams by a set of IPTV scheduled content specified in the information, the trends determined by analyzing the social media streams describing interests in IPTV content by location, time and subscription types, the subscription types comprising an Internet streamer, a high definition subscription, video on demand subscriber and a group subscription, the trend identifying a pattern of bandwidth usage in a particular area at the particular time for viewing the scheduled real-time event;

comparing, by the at least one processor, the trends with the received information to predict an expected demand of the IPTV content at the particular time at different locations and by different subscription types, the expected demand measured in terms of the locations, number of people at the locations and a breakdown of the subscription types at the locations; and reallocating, by the at least one processor, resources to meet the expected demand in delivering the IPTV content to the different subscription types at the different locations and the time, the reallocating resources comprising at least one selected from the group consisting of adding computer memory, network bandwidth, and processing power, wherein network resource capacities are automatically reallocated without user interaction, to the high definition subscription type before reallocating to the Internet streaming subscription type, wherein resource allocating is determined in a self-optimizing IPTV system based on social contents available online, the self-optimizing IPTV system predicting based on the social contents available the expected demand and allocating and reallocating the resources based on the expected demand, the self-optimizing IPTV system training an algorithm for predicting the expected demand, and measuring success of the algorithm for distribution of the resources based on the expected demand over time for training the algorithm over time.

2. The non-transitory computer readable storage medium of claim 1, wherein the receiving information associated with a schedule for delivering the IPTV content comprises receiving information associated with video on demand requests for the IPTV content in the different locations.

3. The non-transitory computer readable storage medium of claim 1, wherein the reallocating resources comprises redistributing network and computer resources in networks that deliver the IPTV content to the different locations.

4. The non-transitory computer readable storage medium of claim 1, further comprising planning to renovate an infrastructure for meeting the expected demand.

5. The non-transitory computer readable storage medium of claim 1, further comprising delivering the IPTV content via the reallocated resources.

6. The non-transitory computer readable storage medium of claim 1, wherein the social media streams comprise data communicated in at least one selected from the group consisting of social networking site, micro-blogging site, news streaming site, media site, and data obtained via search engines.

7. The non-transitory computer readable storage medium of claim 1, wherein the reallocating of the resources is based on at least one selected from the group consisting of scalability, renovation, redundancy infrastructure, and maximizing quality of service to the subscriber types.

8. The non-transitory computer readable storage medium of claim 1, wherein the IPTV content is delivered as at least one selected from the group consisting of video-on-demand (VOD), live television, video recording, time-shifted television, subscription VOD service, and high definition video subscription.

9. A system for delivery of internet protocol television (IPTV) content, comprising:
   a hardware processor; and
   a storage device,
   the hardware processor operable to perform:
      monitoring, by at least one processor, social media streams;
      receiving, by the at least one processor, information associated with a schedule for delivering the IPTV content, the schedule comprising a real-time event occurring at a particular time for real-time viewing of the real-time event, wherein the IPTV content comprises the real-time event occurring at the particular time that has been scheduled;
      identifying trends from the social media streams comprising filtering the social media streams by a set of IPTV scheduled content specified in the information and store the trends on the storage device, the trends determined by analyzing the social media streams describing interests in IPTV content by location, time and subscription types, the subscription types comprising an Internet streamer, a high definition subscription, video on demand subscriber and a group subscription, the trend identifying a pattern of bandwidth usage in a particular area at the particular time for viewing the scheduled real-time event;
      comparing, by the at least one processor, the trends with the received information to predict an expected demand of the IPTV content at the particular time at different locations and by different subscription types, the expected demand measured in terms of the locations, number of people at the locations and a breakdown of the subscription types at the locations; and
      reallocating, by the at least one processor, resources to meet the expected demand in delivering the IPTV content to the different subscription types at the different locations and the time, the reallocating resources comprising at least one selected from the group consisting of adding computer memory, network bandwidth, and processing power, wherein network resource capacities are automatically reallocated without user interaction, to the high definition subscription type before reallocating to the Internet streaming subscription type,
      wherein resource allocating is determined in a self-optimizing IPTV system based on social contents available online, the self-optimizing IPTV system predicting based on the social contents available the expected demand and allocating and reallocating the resources based on the expected demand,
      the self-optimizing IPTV system training an algorithm for predicting the expected demand, and measuring success of the algorithm for distribution of the resources based on the expected demand over time for training the algorithm over time.

10. The system of claim 9, wherein the hardware processor receiving information associated with a schedule for delivering the IPTV content comprises the hardware processor receiving information associated with video on demand requests for the IPTV content in the different locations.

11. The system of claim 9, wherein the hardware processor reallocating resources comprises the hardware processor redistributing network and computer resources in networks that deliver the IPTV content to the different locations.

12. The system of claim 9, wherein the hardware processor further plans to renovate an infrastructure for meeting the expected demand.

13. The system of claim 9, wherein the hardware processor further delivers the IPTV content via the reallocated resources.

14. The system of claim 9, wherein the social media streams comprise data communicated in at least one selected from the group consisting of social networking site, micro-blogging site, news streaming site, media site, and data obtained via search engines.

15. The system of claim 9, wherein the hardware processor reallocates the resources based on at least one selected from the group consisting of scalability, renovation, redundancy infrastructure, and maximizing quality of service to the subscriber types.

16. The system of claim 9, wherein the IPTV content is delivered as at least one selected from the group consisting of video-on-demand (VOD), live television, video recording, time-shifted television, subscription VOD service, and high definition video subscription.

* * * * *